US006995382B2

(12) United States Patent
Ziener et al.

(10) Patent No.: US 6,995,382 B2
(45) Date of Patent: Feb. 7, 2006

(54) ARRANGEMENT FOR THE GENERATION OF INTENSIVE SHORT-WAVE RADIATION BASED ON A PLASMA

(75) Inventors: Christian Ziener, Jena (DE); Kai Gaebel, Jena (DE); Guido Hergenhan, Jena (DE)

(73) Assignee: XTREME technologies GmbH, Jena (DE)

( * ) Notice: Subject to any disclaimer, the term of this patent is extended or adjusted under 35 U.S.C. 154(b) by 0 days.

(21) Appl. No.: 10/777,616

(22) Filed: Feb. 12, 2004

(65) Prior Publication Data

US 2004/0159802 A1 Aug. 19, 2004

(30) Foreign Application Priority Data

Feb. 13, 2003 (DE) ................................ 103 06 668

(51) Int. Cl.
*G01J 1/00* (2006.01)
*G21G 4/00* (2006.01)

(52) U.S. Cl. .................................. 250/504 R; 378/119

(58) Field of Classification Search ............ 250/504 R, 250/423 P, 493.1; 175/67; 378/119; 372/5
See application file for complete search history.

(56) References Cited

U.S. PATENT DOCUMENTS 4,826,084 A * 5/1989 Wallace ...................... 239/290
5,577,092 A 11/1996 Kublak et al.
6,324,256 B1 11/2001 McGregor et al.
6,469,310 B1 * 10/2002 Fiedorowicz et al. .. 250/492.22
6,647,088 B1 * 11/2003 Schmidt et al. ............... 378/34
6,661,018 B1 * 12/2003 McGregor et al. ...... 250/504 R
6,711,233 B2 * 3/2004 Hertz et al. ................. 378/143
6,744,851 B2 * 6/2004 Orsini et al. ................ 378/119
6,760,406 B2 * 7/2004 Hertz et al. ................. 378/119
2002/0015473 A1 * 2/2002 Hertz et al. ................. 378/143

FOREIGN PATENT DOCUMENTS

EP 0 186 491 6/1992
WO WO 97/40650 10/1997
WO WO 01/30122 4/2001

* cited by examiner

*Primary Examiner*—Nikita Wells
*Assistant Examiner*—Johnnie L Smith, II
(74) *Attorney, Agent, or Firm*—Reed Smith LLP

(57) ABSTRACT

The invention is directed to an arrangement for generating intensive radiation based on a plasma, particularly short-wavelength radiation from soft x-ray radiation to extreme ultraviolet (EUV) radiation. The object of the invention is to find a novel possibility for generating radiation generated from plasma in which the individual pulse energy coupled into the plasma and, therefore, the usable radiation output are appreciably increased while retaining the advantages of mass-limited targets. According to the invention, this object is met in that the target generator has a multiple-channel nozzle with a plurality of separate orifices, wherein the orifices generate a plurality of target jets, the excitation radiation for generating plasma being directed simultaneously portion by portion to the target jets.

28 Claims, 8 Drawing Sheets

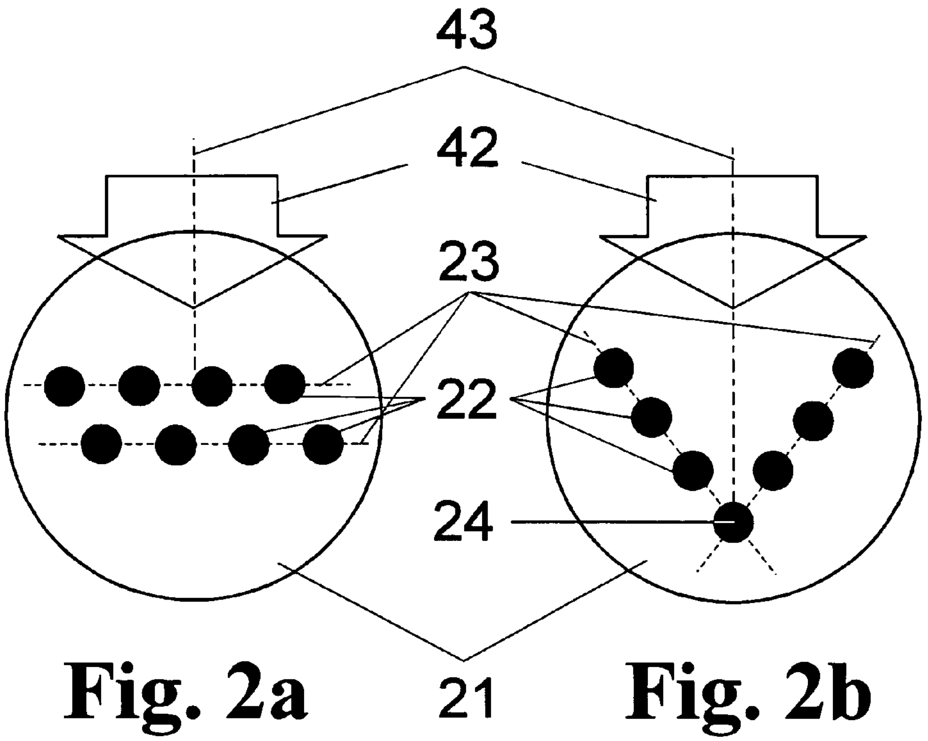
Fig. 2a
Fig. 2b
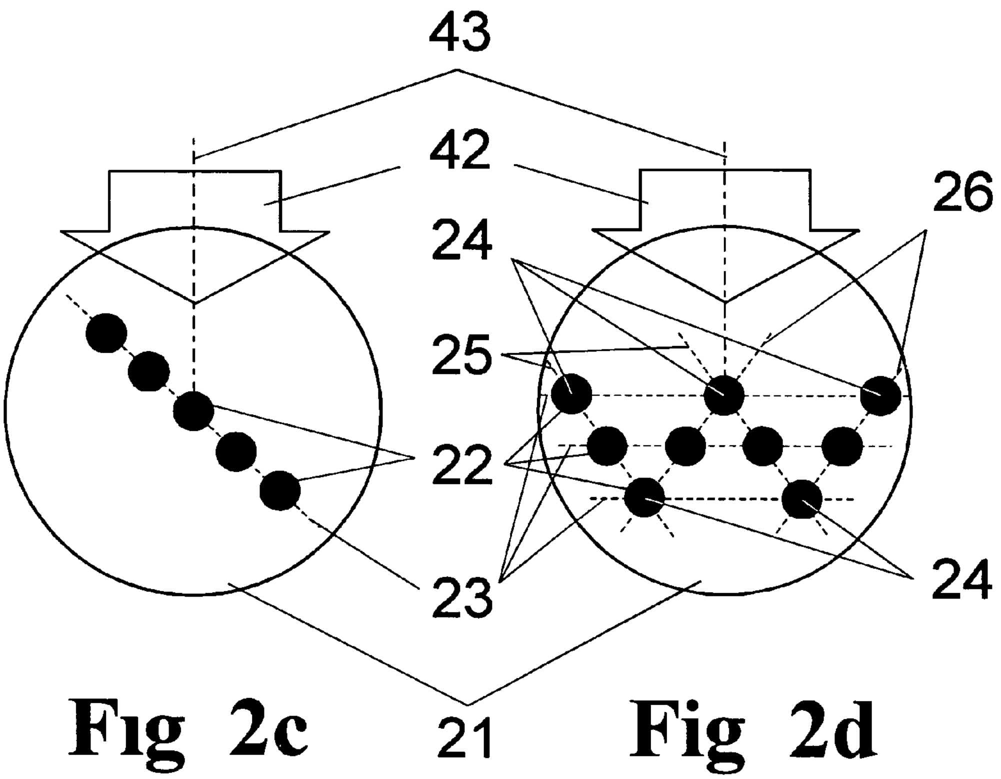
Fig 2c
Fig 2d

ARRANGEMENT FOR THE GENERATION OF INTENSIVE SHORT-WAVE RADIATION BASED ON A PLASMA

CROSS-REFERENCE TO RELATED APPLICATION

This application claims priority of German application Serial No. 103 06 668.3, filed Feb. 13, 2003, the complete disclosure of which is hereby incorporated by reference.

BACKGROUND OF THE INVENTION a) Field of the Invention

The invention is directed to an arrangement for the generation of intensive short-wavelength radiation based on a plasma, wherein high-energy excitation radiation is directed to a target flow in the vacuum chamber and, by means of a defined pulse energy, completely transforms portions of the target flow into a dense, hot plasma which emits particularly short-wavelength radiation in the extreme ultraviolet (EUV) range, i.e., in the wavelength region of 1 nm to 20 nm.

b) Description of the Related Art

The invention is used as a light source of short-wavelength radiation, preferably for EUV lithography in the production of integrated circuits. However, it can also be used for incoherent light sources in other spectral regions from the soft x-ray region to the infrared spectral region.

In order to produce increasingly faster integrated circuits, it is necessary for the width of the individual structure on the chip to be increasingly smaller. Since the resolution in optical methods (optical lithography) is proportional to the wavelength of the light that is used, development is toward increasingly smaller wavelengths. An area with very good prospects for the future is EUV lithography (wavelength around 13.5 nm).

In the interest of economy, a determined throughput of wafers must be ensured, which necessitates a light source having a high minimum output at a defined efficiency of the imaging optics. At the present time, there are no light sources in the wavelength region around 13.5 nm that would be capable of providing the required outputs. Also, the selection of light sources which could potentially be capable of this is very limited.

Based on the present state of knowledge, laser-produced plasmas, discharge plasmas and synchrotrons are the most promising radiation sources for EUV lithography. Sources based on a plasma have the advantage that they can be incorporated relatively easily in existing production processes.

"Mass-limited" targets were developed in order to limit unwanted particle emission in laser-produced plasmas which could sharply reduce the life of the plasma facing optics in particular. These mass-limited targets substantially reduce the amount of debris produced. In this connection, mass-limited means that the available target material is completely transformed into plasma by interaction with the energy beam. Since the amount of material available for generating radiation is therefore limited, the amount of energy in the beam pulse is exactly that amount needed for optimal conversion of, e.g., laser photons into EUV photons. Accordingly, at a given pulse repetition rate of the energy beam, the average output that can be coupled in is fixed and, at a determined conversion efficiency, so also is the maximum EUV output that can be generated. The maximum pulse repetition rate of the energy beam is given in that the target is disturbed through the plasma generation, and a minimum time interval between the individual laser pulses which depends on the transport speed of the target flow is therefore necessary.

Target concepts that have already been suggested include:

- a continuous material jet (target jet) comprising, e.g., condensed xenon (e.g., according to WO 97/40650 A1);
- a dense droplet mist comprising microscopically small droplets (e.g., WO 01/30122 A1);
- cluster targets (e.g., U.S. Pat. No. 5,577,092);
- macroscopic droplets (e.g., EP 0 186 491 B1); and
- ice crystals through the use of a spray (U.S. Pat. No. 6,324,256).

In all of the known target concepts, the amount of material available for an excitation pulse is small, so that the maximum energy of the individual pulse is limited. The transport speed of the target material and the diameter of the target jet can also not be increased to an unlimited extent for physical reasons (hydrodynamics), so that the pulse repetition rate of the energy beam is limited also. Since the average output is given by the product of individual pulse energy and repetition rate of the excitation signal, there is an upper limit for the EUV output that can be generated. Accordingly, with conventional targets it is not possible to reach the high average outputs in the EUV spectral region that are required by the semiconductor industry.

OBJECT AND SUMMARY OF THE INVENTION

It is the primary object of the invention to find a novel possibility for generating radiation generated from plasma, particularly EUV radiation, in which the individual pulse energy coupled into the plasma and, therefore, the usable radiation output are appreciably increased while retaining the advantages of mass-limited targets.

In an arrangement for generating intensive radiation based on plasma, containing a target generator with a nozzle for metering and orientation of a target flow for plasma generation and a vacuum chamber, wherein a high-energy excitation radiation is directed to the target flow in the vacuum chamber and the target flow is completely converted piece by piece by means of a defined pulse energy of the excitation radiation into a plasma having a high conversion efficiency for the intensive radiation in a desired wavelength range, the above-stated object is met according to the invention in that the nozzle of the target generator is a multiple-channel nozzle with a plurality of separate orifices, wherein the orifices generate a plurality of target jets, the excitation radiation for generating plasma being directed simultaneously portion by portion to the target jets.

The individual orifices of the nozzle are advantageously arranged in such a way that a radiation spot focused by the excitation radiation on all of the target jets exiting the nozzle is covered spatially essentially uniformly by parallel target jets, all of the target jets being completely irradiated over their diameter.

The individual orifices of the nozzle can advisably be arranged in at least one row.

It is particularly advantageous with respect to minimizing the coupling losses of the excitation radiation that the individual orifices of the nozzle are arranged in such a way that the target jets fill up the radiation spot of the excitation radiation without gaps and without overlapping, wherein the orifices of the nozzle are arranged so as to be offset to the direction of the excitation radiation for target jets appearing adjacent to one another in the radiation spot.

For this purpose, the individual orifices of the nozzle are preferably arranged along a straight line which encloses an angle between 45° and 90° with the incident direction of the excitation radiation.

In another advantageous construction, the individual orifices of the nozzle are arranged in a plurality of rows at an offset to one another. In this connection, the orifices can advisably be provided as parallel rows with an equal spacing between the orifices in the nozzle, wherein the rows lie one behind the other with respect to the incident direction of the excitation radiation and are arranged so as to be offset relative to one another by a fraction of the spacing between the orifices depending upon the quantity of rows arranged one behind the other. The orifices of the nozzle are preferably arranged in two parallel rows which are oriented orthogonal to the direction of the excitation radiation and are offset relative to one another by one half of the orifice spacing.

In another suitable construction, the rows of orifices intersect, and intersecting rows share their first or last orifice as a common orifice representing the intersection point and are oriented in a mirror-symmetric manner relative to the incident direction of the excitation radiation at the same angle of intersection.

It is particularly advisable that two intersecting rows of orifices are oriented in a V-shaped manner relative to the incident direction of the excitation radiation. The V-shape can be oriented with the tip in the incident direction of the excitation radiation or with the opening in the incident direction of the excitation radiation.

An energy beam pulsed in a desired manner is advantageously provided as excitation radiation for the energy input into the target jets, wherein the energy beam has a focus whose cross-sectional area covers the width of all adjacent target jets simultaneously. The energy beam is preferably generated by a pulsed laser. However, a particle beam, particularly an electron beam or ion beam, can also be used in a suitable manner. An energy beam in the form of a laser beam is advisably focused through cylindrical optics on the target jets on a focus line which is oriented orthogonal to the direction of the target jets.

In another constructional variant, the energy beam can also be composed of a plurality of individual energy beams which are arranged in a row orthogonal to the direction of the target jets to a quasi-continuous focus line by suitable optical elements and strike the target jets simultaneously.

In another advisable arrangement for plasma excitation, the energy beam is composed of a plurality of individual energy beams, each of which is focused on a target jet and all target jets are irradiated simultaneously. A laser with beam-splitting optical elements or a plurality of synchronously operated lasers can be used for generating the row of individual energy beams.

In each of the excitation variants mentioned above, the energy beam is advisably optimized with respect to the efficiency with which it couples energy into the plasma through the use of double pulses comprising a pre-pulse and a main pulse or multiple pulses.

In the area of the interaction with the excitation beam, the target jets proceeding from the orifices of the multiple-channel nozzle are preferably continuous liquid jets, liquid jets which fall in droplet form at the latest in the area of interaction with the excitation radiation, or jets which pass into the solid aggregate state when exiting from the nozzle into the vacuum chamber.

The target jets are preferably generated from condensed xenon. However, target jets comprising an aqueous solution of metallic salts are also suitable.

The arrangement for generating plasma-generated radiation is advantageously used as a radiation source in the wavelength regions between soft x-ray radiation and the infrared spectral region. It is preferably used for the generation of EUV radiation in the wavelength region between 1 nm and 20 nm for devices for semiconductor lithography, particularly for EUV lithography, in the region of 13.5 nm.

The invention proceeds from the basic idea that particularly the radiation outputs from a plasma-based radiation which are required in semiconductor lithography can not be achieved with conventional target preparation because of the mass limitation of the targets and because of the necessary target tracking (target flow). Since the quantity of material that is available for generating radiation after leaving the nozzle is limited and the target size can not be increased to any extent desired, only a limited amount of energy of the excitation radiation can at best be coupled into the plasma emitting the desired radiation.

This seemingly insurmountable barrier of limited energy conversion is overcome, according to the invention, through the construction of a nozzle with a plurality of individual orifices in that the efficiency with which the excitation energy is coupled into plasma is increased and transmission losses are minimized at the same time. The nozzle contains a plurality of channels which serve to generate a plurality of individual target jets in an interaction chamber (vacuum chamber) and to irradiate the individual jets simultaneously with high-energy excitation radiation (e.g., laser beam, electron beam, etc.) in order to generate a spatially expanded, homogeneous plasma.

With the arrangement according to the invention, it is possible to generate radiation, particularly EUV radiation, generated from plasma with a high average output, wherein the individual pulse energy that can be coupled into the plasma and, therefore, the usable radiation output are appreciably increased in spite of the mass limitation of the target.

The invention will be described more fully in the following with reference to embodiment examples.

BRIEF DESCRIPTION OF THE DRAWINGS

In the drawings:

FIGS. 2*a–d* are four top views of the multiple-channel nozzles according to the invention for generating parallel target jets which are arranged one behind the other on gaps so as to be offset relative to one another with respect to the direction of the excitation radiation and which enable greater distances between the channels inside the nozzle with minimal transmission loss of excitation radiation;

DESCRIPTION OF THE PREFERRED EMBODIMENTS

Figure 1:
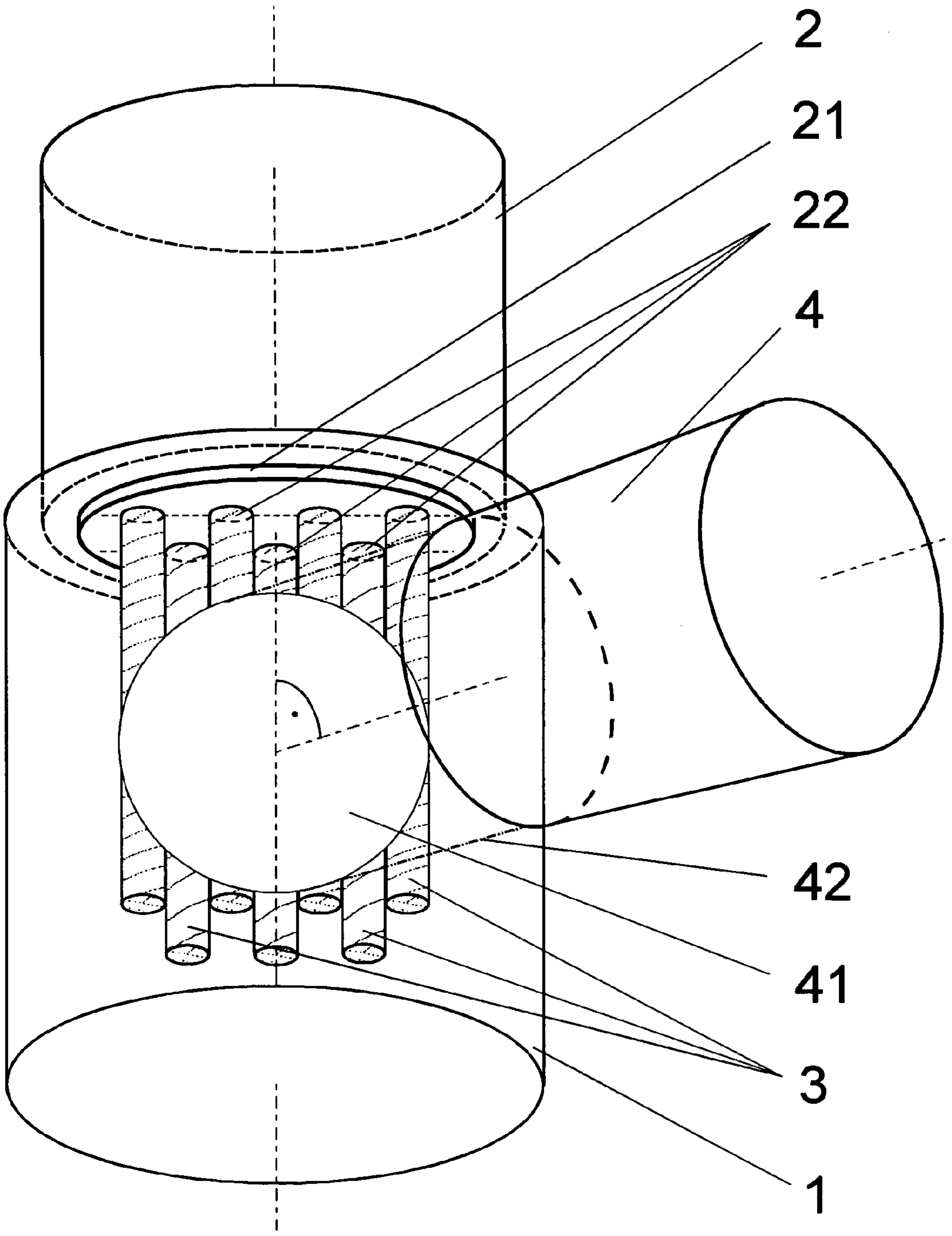
FIG. 1 shows the basic construction of the arrangement according to the invention with a multiple-channel nozzle for generating a plurality of parallel target jets which are spatially offset with respect to the excitation beam and which are arranged on gaps.

In its basic variant, the arrangement according to the invention comprises a vacuum chamber 1, a target generator 2 which generates a bundle of parallel target jets 3 by means of a nozzle 21 having a plurality of individual orifices 22, and an excitation radiation source 4 which is focused orthogonally on the target jets 3 and forms a radiation spot 41 over all of the target jets 3.

The target jets 3 enter the vacuum chamber 1 through the individual orifices 22 of the nozzle 21. In the vacuum chamber 1, they are converted into plasma by bombardment with high-energy excitation radiation from the radiation source 1 which delivers an energy beam 42 (laser beam, electron beam or ion beam) and irradiates all of the target jets 3 simultaneously. The plasma emits light in the relevant spectral region, preferably in the extreme violet (EUV) region.

The target jets 3 are liquid when they enter the vacuum chamber 1, but can be liquid, continuous bet), discontinuous (droplet flow) or solid (frozen) in the area of interaction with the energy beam 42. One possibility consists in using liquefied gases, preferably xenon for generating EUV. Other possible target materials are metallic salts in aqueous solution. Solid target jets 3 are generated by suitably cooled target material in that the target jets are frozen when entering the vacuum chamber 1 and are brought in this state into the area of interaction with the energy beam. The amount of target material available for an individual pulse of the energy beam 42 and, therefore, the optimal individual pulse energy for the generation of EUV radiation is higher by a factor corresponding to the quantity of individual orifices 22 of the nozzle 21 at the identical exit speed of the target material and identical diameter of the individual orifices 22 compared to a conventional single-channel nozzle. In this example, the orifices 22 are arranged in such a way that the transmission losses for the incident energy beam 42 are minimal, i.e., the entire focused radiation spot 41 is completely covered by the target jets 3 arranged on gaps. This can be achieved, e.g., in that the individual orifices are arranged so as to be spatially offset.

In principle, a kind of "watering can nozzle" with orifices 22 arranged in a defined manner is used according to the invention. However, its peculiarity consists in that there are no nozzle orifices 22 which are arranged one behind the other or which substantially overlap in the direction of the energy beam 42. Due to the expansion of the diameters of the target jets 3 during conversion into plasma, even small gaps can remain between the target jets 3 in the projection of the radiation spot 41 of the energy beam 42.

FIG. 2 shows four essential variants of the arrangement of orifices 22 of the nozzle 21 in partial views *a* to *d*.

Figure 4:
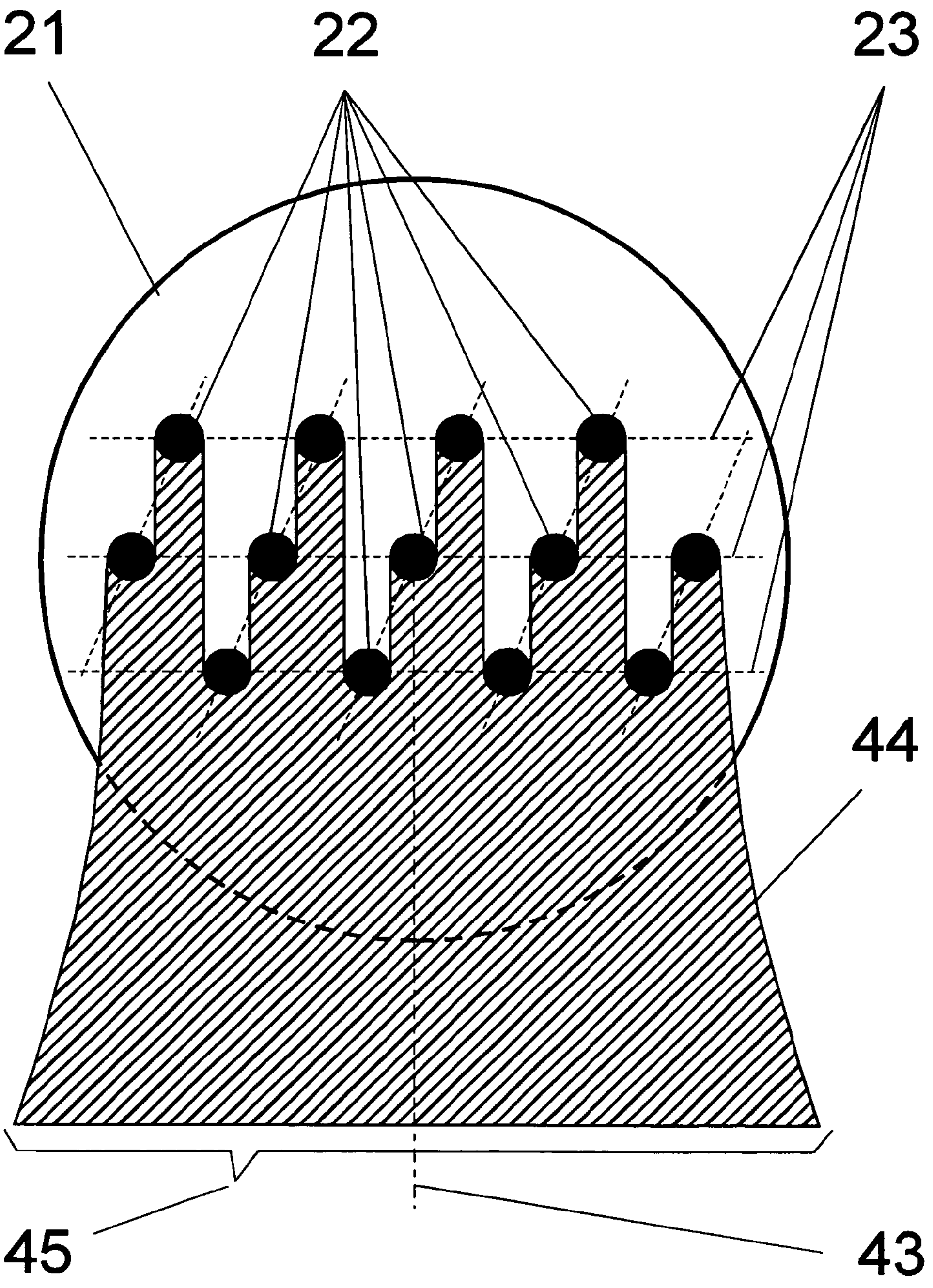
FIG. 4 is a top view of the exit side of a multiple-channel nozzle according to the invention with a plurality of parallel rows of orifices (channels) in which an exciting energy beam (analogous to FIG. 3) makes it possible to irradiate all of the target jets in rows arranged farther behind on another through the spacing between the target jets.

FIG. 2*a* is a top view showing a pattern of orifices 22 as an arrangement of two parallel rows 23 which are offset relative to one another by half of the spacing of the orifices 22 within each row 23. With three parallel rows 23, the offset would be decreased to a third of the spacing of the orifices 22 as will be described more fully in the following with reference to FIG. 4.

In another variant according to FIG. 2*b*, two rows 23 are arranged at opposite angles to the incident direction 43 of the energy beam 42. The two rows 23 share an orifice 22 of the nozzle 21, and the intersection 24 of the two rows 23 is given by this orifice 22 at the same time. The angle relative to the incident direction 43 of the energy beam 42 is identical in terms of amount for both rows 23 and varies depending on the diameter of the orifices 22 and a (possibly intentional) gap formation or slight overlapping of the exiting target jets 3 in the projection of the radiation spot 41 (as is shown in FIG. 1). The pattern of orifices 22 corresponds to a V-shape which can be oriented with the intersection 24 of the rows 23 (i.e., with the tip of the V) in the direction of the energy beam 42 as is shown in FIG. 2*b* or can be oriented opposite to the incident energy beam 42.

FIG. 2*c* shows a possibility in which the orifices 22 are arranged in only one row 23. In order to avoid gaps between the target jets 3, the row 23 is inclined by an angle relative to the incident direction 43 of the energy beam 42 according to the same criteria as in FIG. 2*b*. In case gaps between the target jets 3 are permissible or desirable (see, e.g., the statements referring to FIG. 6), the angle can be very large or exactly 90°. Otherwise, the selected angle is preferably around 45°.

Finally, without implying any lack of further possibilities, FIG. 2*d* shows a combination of the nozzle patterns from FIG. 2*a* and FIG. 2*b*. This arrangement can be described as parallel rows 23 arranged one behind the other with different distances between the orifices 22 or also as V-shapes which continue transverse to the energy beam 42. In essence, however, the pattern is more accurately described as a zigzag pattern oriented transverse to the incident direction 43 of the energy beam 42. Here, two parallel families 25 and 26 of orifices 22 arranged in the direction opposite to the incident direction 43 of the energy beam 42 intersect, and the intersection points 24 are shared orifices 22 as was already described with respect to the V-shape.

Figure 3:
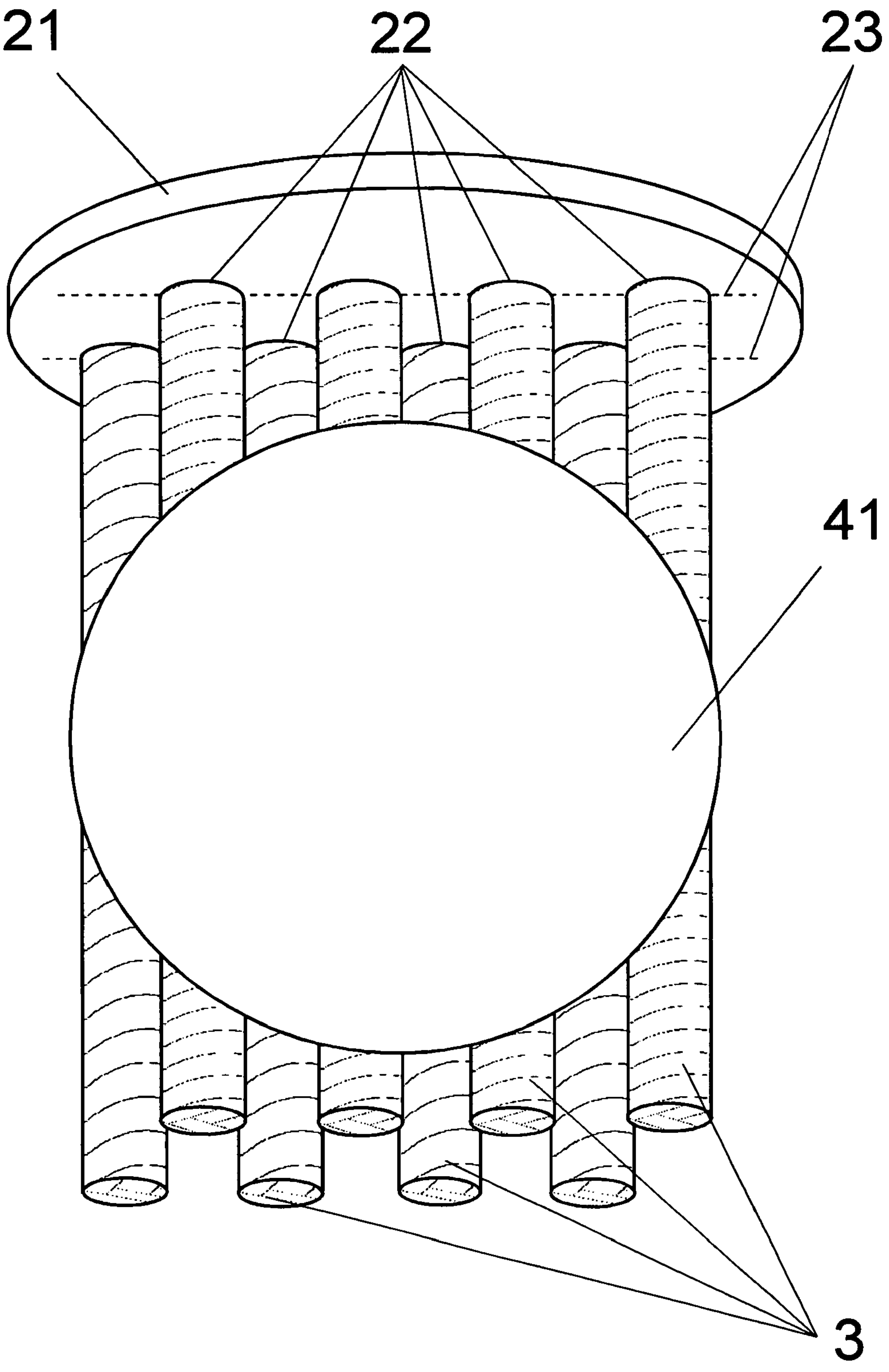
FIG. 3 shows a perspective view of a multiple-channel nozzle with a plurality of rows of orifices which are arranged so as to be offset relative to one another and in which all target jets are excited by an energy beam having a large diameter.

One possibility for coupling energy into the target consists in that the target jets 3 generated by the multiple-channel nozzle 21 are irradiated by a laser as energy beam 42 in such a way that the radiation spot 41 corresponding to the laser focus (also often called the laser waist) is at least as large as the width of the entire bundle of target jets 3 (shown in FIG. 3).

In a case such as that described above, FIG. 4 shows the top view of a nozzle 21 with three parallel rows 23 of orifices 22 arranged one behind the other and the impinging light cone 44, shown schematically, of the laser waist as focused part of the energy beam 42.

As is clearly shown, the rows 23 are each displaced in a parallel manner by about one third of the (uniform) distance between the orifices 22 without overlapping of the target jets

3 exiting therefrom in the light cone 44. However, due to the expansion of the diameters of the target jets 3 when converted into plasma, small gaps can also remain between the target jets 3 in the projection of the radiation spot 41 of the energy beam 42. This ensures that all of the target jets 3 receive the same radiation output of the energy beam 42 and are accordingly optimally excited and can be converted into plasma.

Strictly speaking, the excitation of the target jets 3 is quasi-simultaneous because the target jets 3 from the rear rows 23 of nozzle orifices 22 are actually reached later by the pulse of the energy beam 42 in the propagation direction of the energy beam 42. However, this may be ignored as it relates to plasma generation and will be described as simultaneous hereinafter.

The plasmas (not shown) generated from the target jets 3 merge as a result of the simultaneous excitation of all target jets 3 into one extended plasma with multiplied radiation power (corresponding to the quantity of target jets 3) in the desired wavelength region (e.g., EUV radiation) if other known factors of the energy input (radiation power per target mass, optimized excitation through suitable temporal pulse shape, etc.) for the individual mass-limited target jets 3 are chosen.

Figure 5:
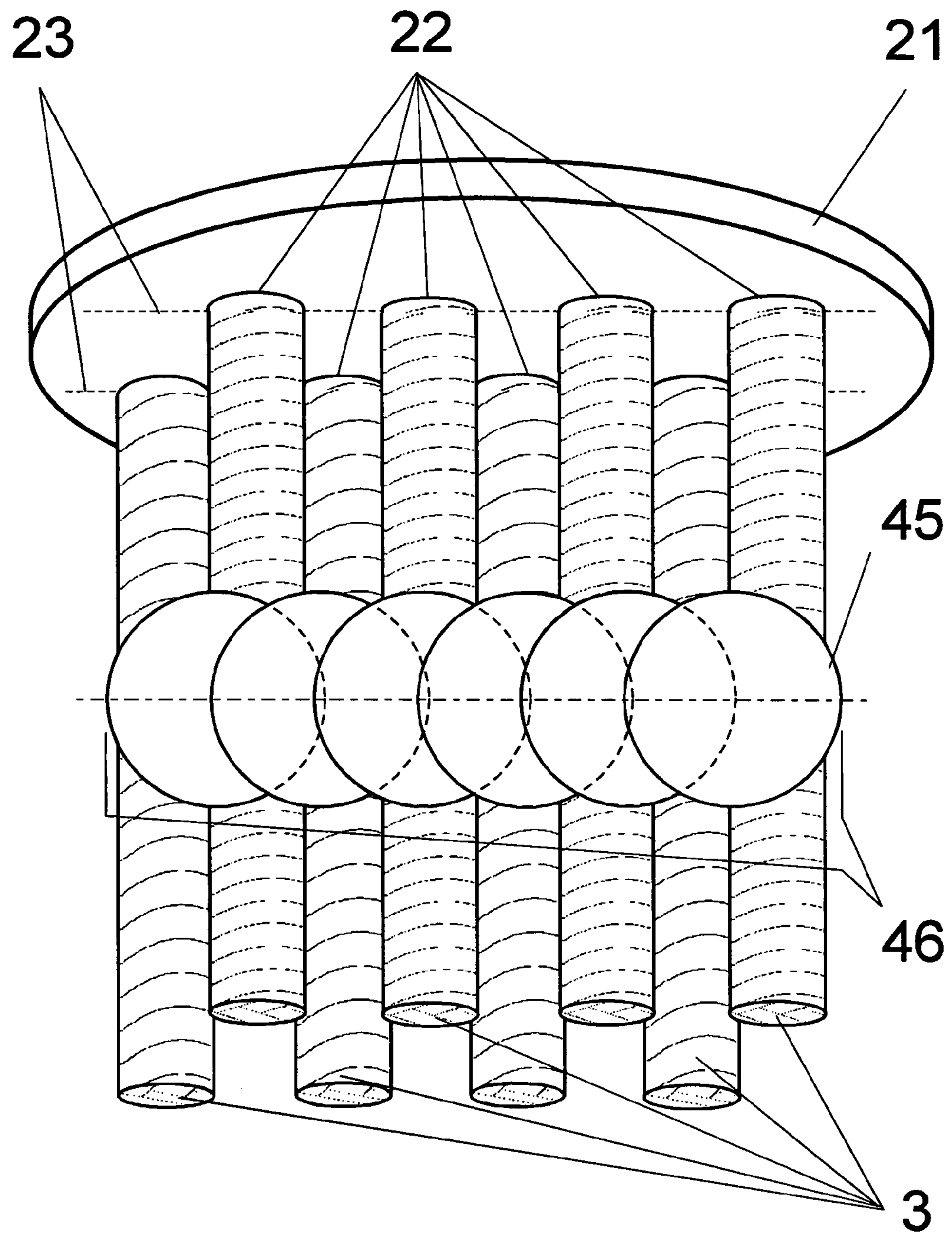
FIG. 5 is a perspective view of a multiple-channel nozzle with channels arranged in two rows so as to be offset relative to one another, wherein the target jets are excited by a plurality of laser beams which are combined to form a line-shaped illumination.

In FIG. 5, the radiation spot 41 for the plasma generation in the entire bundle of target jets 3 is generated by spatial multiplexing in which the excitation radiation comprises a plurality of individual beams 45 in a linear row arrangement 46 which are combined from a plurality of identical lasers or, through beam splitting, from one to a few lasers and bombard the target synchronously with respect to time. This has the advantage that the pulse energy of the individual laser does not need to be as high as in the case of a laser with a large diameter of the focused radiation spot 41. As a result, the foci of the individual beams 45 are arranged one above the other spatially and form a type of line focus 47.

Figure 6:
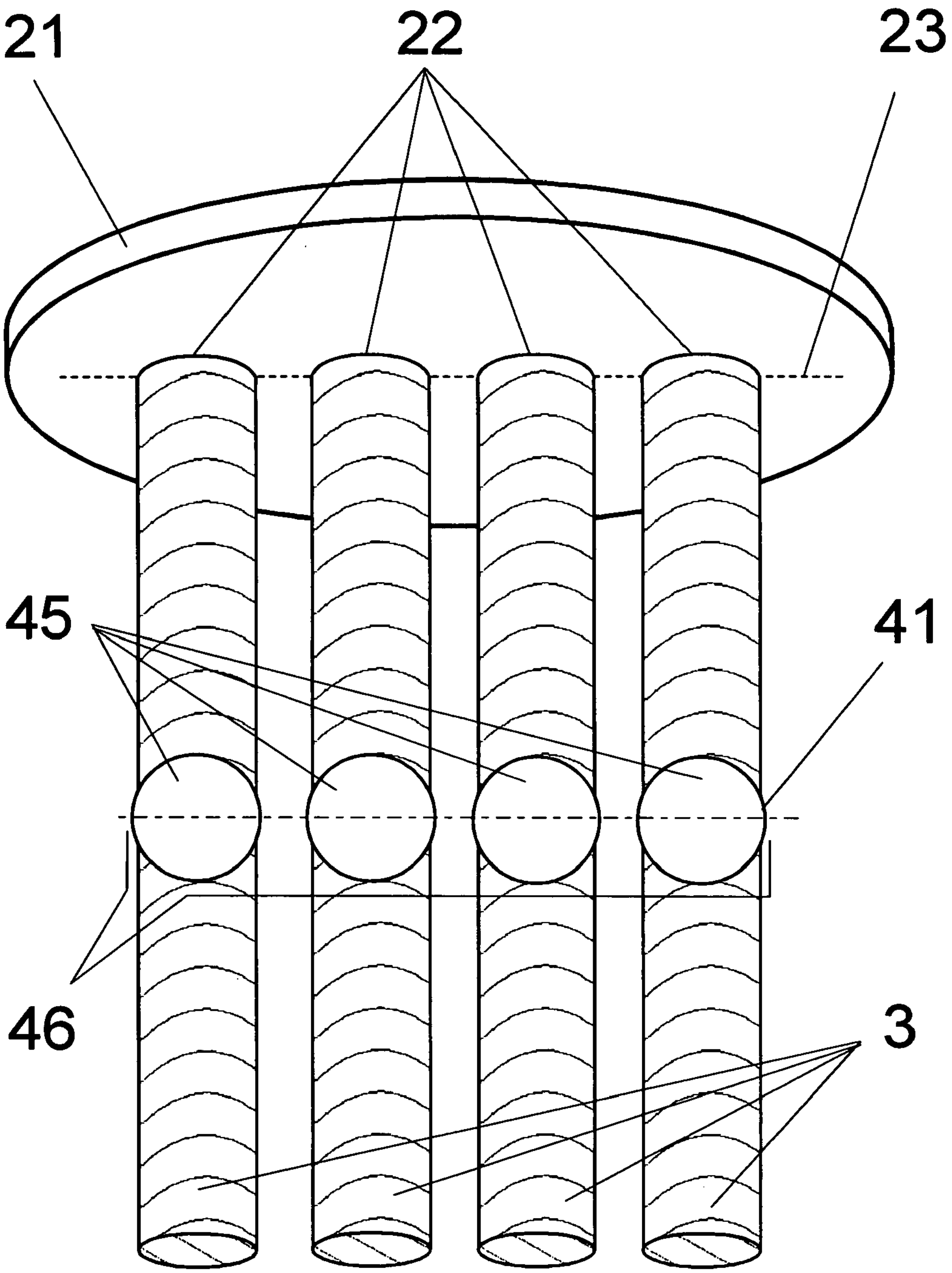
FIG. 6 shows a perspective view of a multiple-channel nozzle with only one linear arrangement of target jets in which laser beams which are arranged next to one another in rows are focused on a target jet.

On the other hand, adjacent focusing of individual beams 45 of lasers is also worthy of consideration insofar as—corresponding to the view in FIG. 6—every target jet 3 is struck by exactly one individual beam 45, so that the arrangement of target jets 3 without gaps is less critical in the design of the nozzle 21 and the orifices 22 can be arranged in only one row. This is important particularly for applications in which the character of a point light source should not be dispensed with for the resulting radiation. In this case, the desired radiation should be coupled out of the plasma orthogonal to the direction of the target jets 3 and to the incident direction 43 of the individual beams 45. Consequently, the transmission losses and accordingly also the in-coupling losses for an individual row 23 of orifices 22 in the nozzle 21 can be minimized in that the individual target jets 3 are irradiated synchronously by a respective individual beam 45 (of a laser).

In addition, the coupling of energy into the target is improved in that a smaller pre-pulse is radiated into the target jets 3 prior in time to the main energy pulse, so that a so-called pre-plasma is "smeared" over the width of the target jets 3 which are arranged at a distance from one another. The energy of the main pulse can be coupled into this pre-plasma very effectively, so that the transmission losses of excitation radiation are minimized in spite of the use of individual target jets 3 and the generation of radiation from the plasma is extensively homogeneous.

Figure 7:
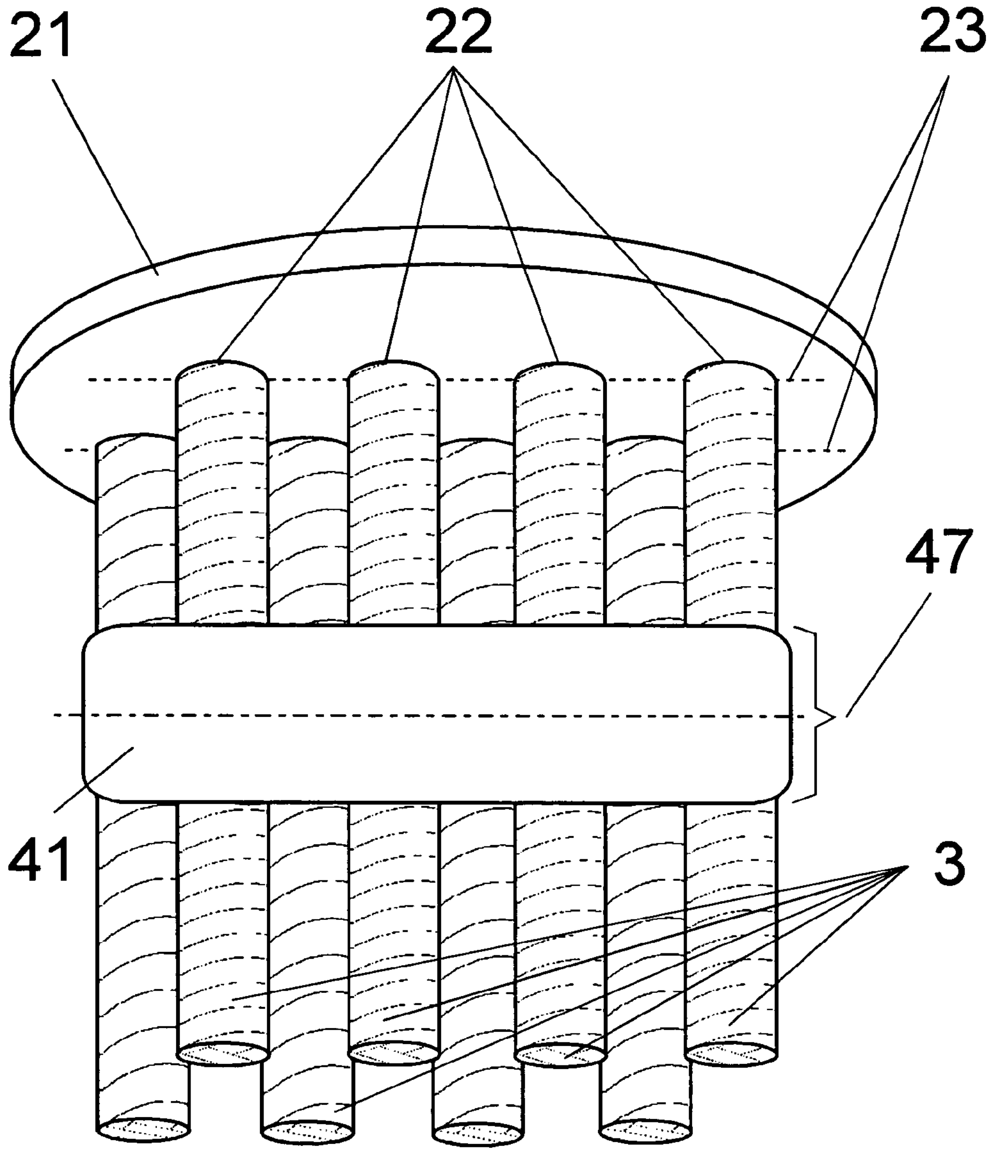
FIG. 7 is a perspective view of a multiple-channel nozzle with channels arranged in two rows so as to be offset relative to one another, wherein the target jets are excited by a line-shaped illumination of a laser beam which is shaped via cylindrical optics.

As can be seen from the view according to FIG. 7, it is likewise possible and useful to employ a true line focus 47 for the irradiation of the target jets 3. The line focus 47 can be generated during laser excitation, e.g., simply by means of cylindrical optics. A line focus 47 of this kind, particularly for large-area bundles of target jets 3 resulting in large-area plasma, can have considerable importance when the homogeneity of the plasma is important for generation of radiation, since a uniform energy input into each target jet 3 is carried out in this configuration.

Figure 8:
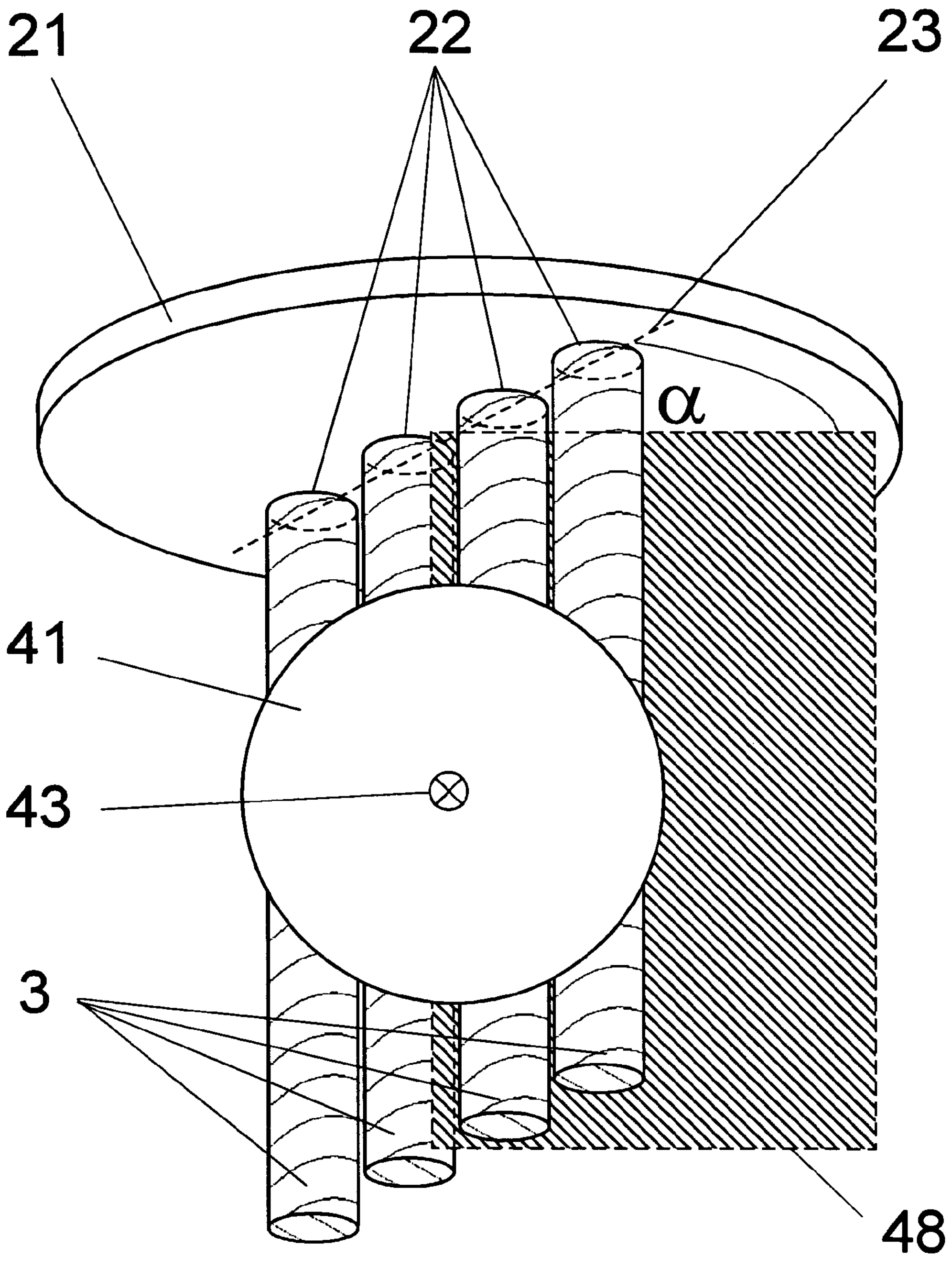
FIG. 8 is a perspective view of a multiple-channel nozzle with only one row of nozzle orifices, wherein the line-shaped arrangement of target jets fill the excitation spot by rotating relative to the normal plane 48 to the excitation radiation (large-diameter laser beam) without gaps.

FIG. 8 shows yet another variant of the arrangement of target jets 3 using a nozzle 21, according to FIG. 2*c*, in which there are no transmission losses of excitation radiation in an individual energy beam 42. Although there is only a single row 23 of orifices 22 of the nozzle 21 and the row 23 between the orifices 22 must compulsorily have spaces, the absence of gaps in the bundle of target jets 3 is brought about in this case in that the row 23 of nozzle orifices 22 encloses an angle a with the normal plane 48 of the incident energy beam 42, so that the spacing present per se between the orifices 22 of the nozzle 21 does not appear in the projection of the radiation spot 41 of the excitation radiation on the bundle of target jets 3 that is rotated in this manner. Therefore, through selection of the angle $\alpha$, the transmission losses can be minimized in a suitable manner or the area-dependent coupling in of energy can be adjusted to a maximum. Further, as an added advantage, a larger area of the radiating plasma results also orthogonal to the directions of the target jets 3 and energy beam 42.

Other design variants of the invention (particularly with respect to the nozzle variations according to FIGS. 2*a* to 2*d*) are readily possible without departing from the framework of this invention. The examples described above were based on parallel target jets 3 which are arranged without gaps and which enable relatively large target masses while retaining mass limitation. Further, other possible configurations with intersecting or overlapping target jets or a plurality of bundles of target jets 3 from variously positioned nozzles are not outside the scope of the invention. In particular, nozzle shapes and target arrangements which are not shown or described explicitly in the drawings are also to be considered as clearly belonging to the teaching according to the invention provided that they rely on the principle of multiplication of the radiation yield through the use of a plurality of mass-limited targets and the synchronous excitation thereof without inventive activity.

While the foregoing description and drawings represent the present invention, it will be obvious to those skilled in the art that various changes may be made therein without departing from the true spirit and scope of the present invention.

Reference Numbers

1 vacuum chamber
2 target generator
21 nozzle
22 orifices
23 row
24 intersection
25, 26 parallel families
3 target jets
4 excitation radiation source
41 focused radiation spot (of the excitation radiation)
42 energy beam
43 incident direction
44 light cone
45 individual beam (of the excitation radiation)
46 linear arrangement (of the individual beam foci)
47 line focus
48 normal plane (of the energy beam)

What is claimed is:

1. An arrangement for generating intensive radiation based on a plasma, comprising:

a target generator with a nozzle for metering and orientation of a target flow for plasma generation;

a vacuum chamber; and a high-energy excitation radiation being directed to the target flow in the vacuum chamber and the target flow being completely converted piece by piece by a defined pulse energy of the excitation radiation into a plasma having a high conversion efficiency for the intensive radiation in a desired wavelength region;

said nozzle of the target generator being a multiple-channel nozzle with a plurality of separate orifices, the orifices generating a plurality of target jets, the excitation radiation for generating plasma being directed simultaneously portion by portion to the target jets within a spot of radiation;

said separate orifices of the nozzle being arranged in such a way that the target jets fill the radiation spot of the excitation radiation without gaps and without overlapping, wherein the orifices are arranged offset although the target jets appear closed to one another in the radiation spot.

2. The arrangement according to claim 1, wherein said separate orifices of the nozzle are arranged in a plurality of rows so as to be offset to one another.

3. The arrangement according to claim 2, wherein said separate orifices of the nozzle are provided as parallel rows with an equal spacing between the orifices, wherein the rows are arranged one behind the other with respect to the incident direction of the excitation radiation and are arranged so as to be offset relative to one another by a fraction of the spacing between the orifices depending upon the quantity of rows arranged one behind the other.

4. The arrangement according to claim 3, wherein said separate orifices of the nozzle are arranged in two parallel rows which are oriented orthogonal to the direction of the excitation radiation and are offset relative to one another by one half of the orifice spacing.

5. The arrangement according to claim 2, wherein the rows of orifices intersect, and intersecting rows share their first or last orifice as a common intersection and are oriented in a mirror-symmetric manner relative to the incident direction of the excitation radiation at the same angle of intersection.

6. The arrangement according to claim 5, wherein two intersecting rows of orifices are oriented in a V-shaped manner relative to the incident direction of the excitation radiation.

7. The arrangement according to claim 6, wherein the V-shape is oriented with the tip in the incident direction of the excitation radiation.

8. The arrangement according to claim 6, wherein the V-shape is oriented with the opening opposite to the incident direction of the excitation radiation.

9. The arrangement according to claim 1, wherein said separate orifices of the nozzle are arranged in one row wherein said one row of orifices is oriented oblique to the direction of excitation at an acute angle as to have each separate orifice of the row in different parallel planes being arranged one behind the other and perpendicular to the incident direction of the excitation radiation.

10. The arrangement according to claim 1, wherein a pulsed energy beam is provided as excitation radiation, wherein the energy beam has a focus whose cross-sectional area covers the width of all adjacent target jets simultaneously.

11. The arrangement according to claim 10, wherein the energy beam is generated by a pulsed laser.

12. The arrangement according to claim 10, wherein the energy beam is a particle beam, particularly an electron beam.

13. The arrangement according to claim 10, wherein the energy beam is a particle beam, particularly an ion beam.

14. The arrangement according to claim 10, wherein the energy beam is focused through suitable optics onto the target jets as a focus line which is oriented orthogonal to the direction of the target jets.

15. The arrangement according to claim 10, wherein the energy beam is composed of a plurality of individual energy beams, the plurality of energy beams being arranged in a row orthogonal to the direction of the target jets to form a quasi-continuous focus line by suitable optical elements and strike all target jets simultaneously.

16. The arrangement according to claim 10, wherein the energy beam is composed of a plurality of individual energy beams, each of the individual energy beams being focused on one target jet and all target jets are irradiated simultaneously.

17. The arrangement according to claim 15, wherein a laser with beam-splitting optical elements is provided for generating a row of individual energy beams.

18. The arrangement according to claim 15, wherein a plurality of synchronously operated lasers is provided for generating a row of individual energy beams.

19. The arrangement according to claim 10, wherein the energy beam is optimized with respect to the efficiency of energy conversion into plasma through the use of multiple pulses, particularly double pulses comprising pre-pulse and main pulse.

20. The arrangement according to claim 1, wherein the target jets proceeding from said separate orifices of the multiple-channel nozzle are continuous jets in the area of interaction with the excitation radiation.

21. The arrangement according to claim 1, wherein the target jets proceeding from said separate orifices of the multiple-channel nozzle fall in droplets at the latest in the area of interaction with the excitation radiation.

22. The arrangement according to claim 1, wherein the target jets are liquid jets.

23. The arrangement according to claim 1, wherein the target jets are frozen solid jets when exiting from the orifices into the vacuum chamber.

24. The arrangement according to claim 22, wherein the target jets are generated from condensed xenon.

25. The arrangement according to claim 22, wherein the target jets are generated from aqueous solution of metallic salts.

26. The arrangement according to claim 1, further comprising the step of generating plasma-emitted radiation in a wavelength range between soft x-ray and infrared spectral range.

27. The arrangement according to claim 1, comprising the step of generating EUV radiation in the wavelength range between 1 nm and 20 nm for devices used in semiconductor lithography, particularly for EUV lithography in the wavelength band about 13.5 nm.

28. The arrangement according to claim 1, wherein the separate orifices of the nozzle are arranged in such a way that a radiation spot focused by the excitation radiation on all of the target jets exiting the nozzle is covered spatially essentially uniformly by parallel target jets, all of the target jets being completely irradiated over their diameter.

* * * * *